United States Patent [19]  
Coucher

[11] 4,159,879  
[45] Jul. 3, 1979

[54] BREAD MAKING MACHINE
[75] Inventor: Robert G. Coucher, Salt Lake City, Utah
[73] Assignee: Pioneer Associates #2, Salt Lake City, Utah
[21] Appl. No.: 668,227
[22] Filed: Mar. 18, 1976
[51] Int. Cl.² .............................................. B01F 7/16
[52] U.S. Cl. ..................................... 366/98; 366/142; 366/197; 366/251
[58] Field of Search ............... 259/8, 24, 44, 67, 108, 259/122, 125, 119, 185, DIG. 10, DIG. 14; 220/324; 366/98, 142, 197, 342, 343, 250, 251

[56] References Cited
U.S. PATENT DOCUMENTS

| | | | |
|---|---|---|---|
| 1,935,857 | 11/1933 | Nachumsohn | 259/122 |
| 2,565,269 | 8/1951 | Saxton | 220/324 |
| 2,828,113 | 3/1958 | Knibb | 259/122 |
| 2,896,556 | 7/1959 | Sippel et al. | 259/DIG. 10 X |
| 2,946,299 | 7/1960 | Clifford | 259/122 |
| 3,606,260 | 9/1971 | Rubin | 259/107 |
| 3,854,705 | 12/1974 | Shaff | 259/185 |
| 3,966,178 | 6/1976 | Stevens | 259/185 |

Primary Examiner—Harvey C. Hornsby  
Attorney, Agent, or Firm—Trask & Britt

[57] ABSTRACT

An appliance for mixing bread dough is constructed in association with a support structure adapted for mounting atop an open bucket. A high speed, low power motor is mounted atop the structure, and is connected through a speed-reducing transmission to drive a shaft projecting down from the support structure in axial alignment with the center of the bucket. A dough hook is attached to the driven shaft to turn within the bucket. The motor is selected from those which are rated between one-tenth and one-fifteenth horsepower, have a minimum unloaded speed of 8,000 rpm and a maximum loaded speed of 5,000 rpm. The reduction ratio of the transmission is correlated with the motor to effect an unloaded mixing speed for the dough hook of no less than 75 rpm and a maximum kneading speed at full load of no more than 50 rpm.

9 Claims, 6 Drawing Figures

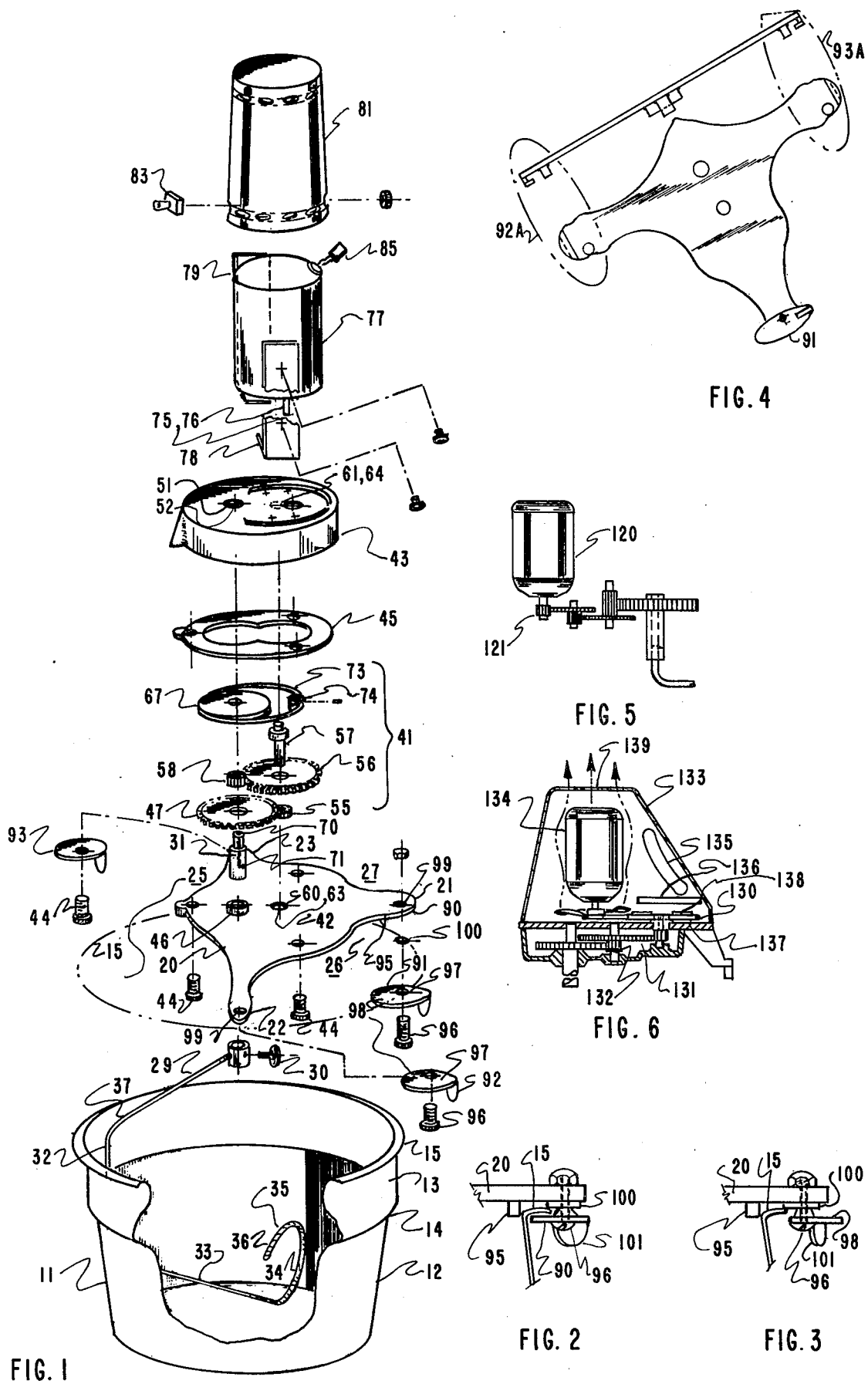

BREAD MAKING MACHINE

BACKGROUND OF THE INVENTION

1. Field

This invention pertains to dough mixing machines and is specifically directed to such a machine suitable for use as a home appliance capable of mixing in a single batch sufficient bread dough to utilize the full capacity of a typical kitchen oven.

2. State of the Art

In recent years there has developed a substantial market for home appliances adaptable for use in mixing bread dough. Most such appliances are marketed in conjunction with companion appliances adapted for milling grain into flour. In fact, a prime factor in the development of the market for bread mixers has been the realization that sales of home grain mills are stimulated when they are marketed in conjunction with bread mixing appliances. Many high quality grain mills suitable for home use are available from domestic sources, but domestic machines adapted for the mixing of bread dough are not so readily available. The available special purpose dough making machines are intended for commercial application, and are thus unrealistic in size and weight for home use. Accordingly, competing grain mill distributors have been forced to select companion dough mixers from whatever general purpose appliances are available that might incidentally have the capacity to mix bread dough. Such general purpose appliances traditionally originate in Europe where the practice has been to utilize a single, multi-purpose machine rather than the plurality of special purpose appliances traditional in the United States.

The kitchen mixers generally available in the United States lack the power to mix even small quantities of bread dough. Other available appliances, for example ice cream freezers and the like, are also unsuitable as bread mixing appliances, primarily because the motors and drive trains associated therewith lack the power and durability required for this task. Efforts to utilize such appliances as bread mixing machines have thus far been unsuccessful.

The general purpose kitchen appliances imported from Europe for marketing together with grain mills are unduly expensive because of their unnecessary versatility, and they are generally not primarily designed for the purpose of mixing bread dough. The capacity of these machines tends to be limited so that a plurality of mixes is required to produce sufficient bread dough to satisfy the capacity of a conventional kitchen oven.

There has been and remains a need for a kitchen appliance capable of producing in a single mix sufficient bread dough to utilize the capacity of a conventional kitchen oven. It is necessary that such an appliance be capable of extensive, although intermittent use, but that it utilize a power train sufficiently compact and light weight to be conveniently utilized in the home. The preparation of bread dough requires a machine capable of both mixing ingredients into a fluid batter and kneading a sticky mass of dough. The dough developes widely varying characteristics as gluten is developed during the kneading stage. Preferably, both mixing and kneading should be accomplished with a single dough hook.

Heretofore efforts to develop a sufficiently powerful kneading apparatus have required the attendant slowing down of the dough hook. In fact, it is believed that slow kneading action is desirable from the standpoint of developing a palatable bread dough. Such slow speeds are unsuitable for mixing ingredients at the initial stages of the mixing cycle. Accordingly, it is an essential feature of any commercially attractive bread mixing appliance that a high mixing speed be available. The provision of multiple running speeds for an appliance involves additional expense and tends to reduce the reliability of a heavy-duty appliance.

SUMMARY OF THE INVENTION

The present invention provides a long-lasting, heavy-duty, bread mixing machine capable of mixing large batches of dough in a single mix. The capacity of the mixer is in many instances several times that of the bread mixers heretofore marketed for home use. Nevertheless, it is of rugged and simple construction, so that it is capable of withstanding heavy-duty mixing cycles through years of life. It may be marketed at a much lower cost than is characteristic of the general purpose machines heretofore available.

In general, the apparatus of this invention comprises a high speed motor of very specific type mounted atop a support structure which in turn is anchored atop a open mixing vessel. The support structure is adapted for releaseable attachment to the top of the mixing vessel so that it serves as an anchoring means for holding a dough hook in appropriate relation with respect to the interior of the vessel. The support structure provides access for pouring ingredients into the interior of the vessel and suspends the driven axle of a transmission in axial alignment with the vessel for driving the dough hook at prescribed rates of speed through the ingredients during a first or mixing cycle and a second or kneading cycle.

The driven axle or output axle is connected to a high speed motor (which will be described in greater detail hereinafter) through a reducing transmission. The transmission may be of various configurations, but generally must be capable of effecting a reduction of at least 80 to 1, but preferably much more; e.g., 120 to 200 to 1. Although worm drives and direct gear drive systems are operable, the preferred transmission includes a belt driven first stage to reduce noise levels and minimize gear wear.

Of principal importance is selection of an appropriate electric motor. It has been found that conventional low speed motors are unsuitable for use with an appliance of this type. Low speed motors (1750 rpm) of sufficient power to drive a dough hook through dough during the kneading stage ($\frac{1}{4}$ to $\frac{1}{2}$ horsepower), are heavy and too large for mounting atop the mixing vessel. Reducing the size of the motor effects a corresponding reduction in horsepower to the extent that available motors of useable size are generally unsuitable for mixing more than very small batches of dough. Surprisingly, high speed motors within a limited specification range may be usefully adapted to bread mixing machines of the type contemplated by this invention. Such motors may be characterized as fractional horsepower, universal type, AC-DC, series wound, induction motors.

In practice, it has been found that motors of less than about 1/15 horsepower or larger than about 1/10 horsepower are unsuitable for use. All of the motors thus far found suitable for use with this invention have electrical and mechanical characteristics substantially similar to the aforementioned class of motors sold by the Dayton Motor Company of Dayton, Ohio under model designations 2MOss, 2MO34, 2MO57 and 2MO66. All of the aforementioned motors are rated 1/15 horsepower. The corresponding motor rated 1/10 horsepower; i.e., Dayton Motor Company Model 2MO37, although operable, is regarded as marginal in operation, even though it theoretically produces substantially more power than the smaller motors.

Suitable motors, as represented by the foregoing class, should be selected from those having the following characteristics:
 (a) They should produce between about 1/10 and about 1/15 horsepower;
 (b) They should exhibit unloaded speeds of about 8,000 rpm as a minimum;
 (c) They should have rated speeds at full load of about 5,000 rpm as a maximum.

Although the horsepower specifications appear to be surprisingly rigorous (Utilizing larger horsepower motors is detrimental to the functioning of the mixing machine), considerable variation is tolerable in the unloaded and full load speed characteristics, provided the aforementioned minimums and maximums are observed. For example, motors with unloaded speeds much higher than the minimum 8,000 rpm specified, e.g., from a typical 12,000 rpm up to as much as 20,000 rpm are tolerable. The corresponding speeds at full load may be as low as 3,000 rpm.

The reduction ratio of the transmission interconnecting the output shaft of the bread mixer with the motor shaft must be closely coordinated with the motor characteristics selected. Thus, the transmission is structured to effect a reduction of between about 80 to 1 up to about 180 to 1, the precise reduction ratio being selected (in connection with the motor characteristics) to provide an initial mixing speed (that is, the speed of the output shaft of the mixer when the motor is first turned on and no substantial resistance is applied to the output shaft) of at least about 75 rpm and preferably within the range of about 80 to about 120 rpm. Initial mixing speeds of 200 rpm or more are tolerable, but not prefered. The corresponding kneading speed at full load should be no more than about 50 rpm, and preferably between about 30 and about 45 rpm. Ideally, the reduction characteristics of the transmission are such that a typical bread dough mixture effects less than full loading on the motor. It is possible to substantially overload the motor, however, if appropriate cooling expedients are provided.

BRIEF DESCRIPTION OF THE DRAWINGS

In the drawings which illustrate what is presently regarded as the best mode for carrying out the invention, FIG. 1 is a view in exploded diametric illustration of a bread mixer of this invention;

FIGS. 2 and 3 are fragmentary orthographic views illustrating the operation of attachment mechanism;

FIG. 4 is an orthographic assembly with view rotated 90° with respect to each other, illustrating an alternative attachment mechanism;

FIG. 5 is a fragmentary orthographic view showing portions of an alternative form of a reducing transmission useful in the practice of this invention; and FIG. 6 is a view partially in cross-section of another alternative reducing transmission configuration.

DESCRIPTION OF THE ILLUSTRATED EMBODIMENTS

As illustrated by FIG. 1, the bread mixer of this invention includes a stainless steel mixing vessel 11 substantially cylindrical in configuration with an open, substantially circular top. The specific vessel shown is of a type designed to be received by a steam table and includes a gently tapering bottom section 12 and an enlarged upper section 13 defining a ridge 14 for nesting in a steam table or the like and an upper flanged outwardly projecting rim 15.

The mechanism of the bread mixer is carried by support structure 20 which may be variously configurated, but in the form illustrated, includes three support arms 21, 22, 23 of which the arm 21 may be regarded as a back support and the remaining arms 22, 23 may be regarded as side supports. With the structure 20 mounted atop the mixing vessel 11, a substantial region 25 is unobstructed to permit access for pouring ingredients through the support structure 20 into the interior of the vessel 11. In the illustrated form, smaller access regions 26, 27 are provided, although in other embodiments, the support structure 20 takes the form of a partial cover or plate which seals these auxiliary access spaces.

A dough hook 29 is connected by any convenient fashion, such as the thumb screw 30 shown, to a drive shaft 31 projecting down from the underside of the support structure 20 in axial alignment with the center axis of the mixing vessel 11. Although various dough hook configurations are operable, those which have been found most suitable in practice include structures corresponding to those illustrated, including a first depending arm 32 which passes adjacent the internal side wall of the mixing vessel 11 as the dough hook revolves with the rotation of the drive shaft 31. Desirable spacing between this depending arm 32 and the interior wall of the vessel should be about ¼ inch. A bottom wiping arm 33 extends approximately ¾ the diameter of the vessel 11 within approximately ⅛ inch from the bottom surface of the vessel. An upstanding arm 34 terminates in an inward projecting hook 35 with a smaller depending arm 36 biased slightly forward in the direction of rotation, approximately midway between the axis of the vessel 11 and the upstanding arm 34. It has been found advantageous to connect the depending side arm 32 to the drive shaft 31 by means of a sloped connecting rod 37.

The drive shaft 31 is driven through a reducing transmission designated generally 41 contained within a housing defined by a portion 42 of the support structure 20 and a removable housing cover 43 adapted for securement to the housing plate 42 by means of screws 44 to effect a gasket seal with an interleaved gasket 45.

The drive shaft 31 is driven through a nylon bushing 46 set in the housing plate 42 and receives power from a final stage drive gear 47 connected to the drive shaft and spaced slightly from and held by the bushing 46 to turn with slight clearance above the housing plate 42. The upper end of the drive shaft 31 is received by a steel bushing 51 packed with an oil-saturated felt reservoir 52. The final stage drive gear 47 is powered by the final stage pinion gear 55 associated with an intermediate stage driven gear 56 on an intermediate shaft 57 journaled at opposite ends in steel bushings 60, 61, also provided with oil-saturated felt reservoirs 63, 64.

The intermediate driven gear 56 is driven by the intermediate stage pinion gear 58 which is associated with a large driven pulley 67 mounted to turn on the upper portion of the drive shaft 31. A portion of the felt reservoir 52 extends into an axial bore 70 in the drive shaft to communicate with a small transverse oiling hole 71 which provides lubrication for the interface between the free wheeling elements 58, 67 and drive shaft 31. The driven pulley 67 is powered by an O-ring belt 73 and small drive pulley 74 carried at the distal end 75 of the drive shaft 76 of an electrical motor 77 mounted atop the gear transmission cover 43 as shown by means of side mounting brackets 78, 79. The motor 77 is provided with a motor cover 81 which accommodates, besides the motor 77, an on-off switch 83 and circuit overload protector device 85.

The motor illustrated is a universal type, AC-DC, series wound induction motor rated at 1/15 horsepower supplied by Dayton Motor Company of Dayton, Ohio, and has a rated full-load speed of 5,000 rpm. Any of the Dayton Model Numbers 2MO33, 34, 57 or 66 are suitable for use, although in the illustrated instance, the model 2MO34 is selected because of its preferred direction of rotation, shaft diameter and sleeve bearings. All of the aforementioned motors are of identical size and shape, and motor characteristics differing only in minor mechanical details.

With any of the foregoing Dayton motors, it is desirable that the transmission effect a reduction of at least 120 to 1, preferably much more. As illustrated, a 32 pitch gear set is used throughout, permitting a variety of reduction ratios to be built into the transmission through minor variations in the numbers of teeth on the pinion and driven gears, respectively. As shown, the final stage pinion 55 has 12 teeth and the final drive gear 47 has 84 teeth, while the intermediate stage pinion 58 has 16 teeth and the intermediate driven gear 56 has 80 teeth. These two stages thus effect a reduction of 35 to 1. The pulleys in the illustrated embodiment are dimensioned to effect a reduction of 4.8 to 1 so that the total reduction ratio of the transmission is 168 to 1. It will be readily appreciated that a reduction ratio 120 to 1 can be obtained by merely replacing the final stage pinion and driven gear with corresponding gears identical to those utilized in the intermediate stage. In practice, an overall reduction of 120 to 1 in combination with the Dayton motors specified is regarded as marginal, for long term or heavy service. Reduction ratios in excess of 180 to 1 produce an unacceptably slow initial mixing speed for most purposes.

The unloaded speeds of the motors utilized in the practice of this invention vary appreciably. When connected to drive a transmmission with a reduction ratio of about 165 to 1, they typically produce an initial mixing speed in the range of 80 to 100 rpm. The calculated speed of the dough hook with the motor operating at full load through such a transmission is approximately 30 rpm. In mixing bread dough, it is customary to introduce water and certain other ingredients, such as salt, oil, honey or other sweetners, and to then start the motor to turn the dough hook at its unloaded speed of 80 to 100 rpm to stir or mix the ingredients. A portion of the flour is then added and stirred in without appreciably reducing the speed of the dough hook. In many recipes, a small amount of additional liquid with yeast is added, followed by the addition of the remaining flour. As this flour is added, the speed of rotation of the dough hook gradually decreases, effecting a lower-speed kneading action as the dough is formed.

It has been found that the motor and transmission illustrated effected kneading action at a speed substantially above the full load speed, typically in the range of 35 to 45 rpm, even with very stiff doughs. Thus, kneading of the dough is accomplished without bringing the motor to its full load, thereby avoiding overheating of the motor. Overheating of the motor results in degradation through shorting of portions of the windings. It is recognized that the mixer might in practice be put to uses more demanding than those described in this disclosure. In the illustrated instance, the circuit overload protector 85 is a thermostatic switch. Should rotation of the dough hook 29 be impeded for any reason, or should the mixer be used for applications which limit rotation of the dough hook for substantial periods to below its full load speed rating, the switch 85 opens to prevent overheating.

It will be understood that the forces required to knead various doughs is highly variable, being influenced by the specific ingredients used. The quality and moisture content of the wheat or other grain available for use are highly variable. Nevertheless, through extensive testing, it has been found that the aforedescribed mixer can readily blend and knead all common yeast bread recipes calling for as much as 24 cups of whole wheat flour. The aforedescribed mixer can routinely produce batches of dough sufficient to form up to eight one pound loaves, more than the normal kitchen oven capacity.

A three-point locking system is preferred for attaching the support structure to the upper rim of the mixing vessel. Such a system can take many forms, of which that illustrated by FIGS. 1, 2 and 3 is representative only. A first attachment point 90, usually at the back of the support structure 20, is selected and a latch 91 is provided for bearing against the underside of the rim 15. A pair of grips 92, 93 adapted to hold against the undersurface of the outer rim 15 are provided in spaced relation from the latch 91 at a distance greater than ¼ the length of the perimeter of the rim 15.

The system illustrated by FIG. 4 requires hooking the spaced grips 92A, 93A under the rim 15 and thereafter effecting a latch at the latch point 91 to effect a tight seating atop the bucket. The system illustrated by FIG. 1 is less cumbersome and thus referred. As there shown, a set of dogs 95 depends from the support structure 20 to locate it properly with respect to the mixing vessel 11. These dogs 95 resist distortion of the rim 15 when pressure is applied through operation of the cam locks 91, 92, 93.

Referring specifically to FIGS. 2 and 3, each cam lock 91, 92, 93 is mounted to rotate on an axle 96 (a shoulder bolt, rivet or other fastener) inserted through an off center bore 97 in a cam portion 98 and a corresponding bore 99 in the support structure 20. A bell washer 100 or other biasing means is desirably interposed between the cam 98 and the support 20 as shown. The cam 98 may be rotated selectively by a protruding, thumb operated, handle portion 101 between a locked position (FIG. 2) and an unlocked position (FIG. 3).

FIG. 5 illustrates a motor 120 and drive train assembly which relies entirely upon gears for speed reduction. Although a direct gear drive of this type is operable, it is generally undesirable because the high speed pinion gear 121 in the first reduction stage creates an irritating high pitched noise. Moreover, the useful life of the first reduction stage is generally much less when gears are relied upon. The noise level of the transmission is decreased to practical limits by utilizing a first stage belt reduction of at least a 4:1 reduction ratio.

The embodiment illustrated by FIG. 6 is especially preferred in that the drive train isolates the belt reduction stage 130 from the gear reduction stages 131, 132. Thus, the gears may be lubricated without exposing the belt to the lubricants. An injection-molded plastic cap 133 covers the motor 134 and belt stage 130. The cap may include a handle portion 135 and is desirably provided with internal structure 136 to define a spiraled chamber about the pulley 137. The pulley 137 may be provided with vanes (not visible) to pump air in through the back 138 of the cap 133 across the motor 134 and out the top 139 of the cap 133. Sufficient cooling can be accomplished in this fashion to permit substantially increasing the load on the motor 134.

Reference herein to details of the illustrated embodiments is not intended to limit the scope of the appended claims which themselves recite those features regarded as essential to the claimed invention.

I claim:

1. A machine adapted to rotate a dough hook within an open-topped mixing vessel during a mixing mode of operation at a speed of at least about 75 rpm to mix ingredients into bread dough and during a subsequent kneading mode of operation at a speed of no more than about 50 rpm to knead said dough, comprising:
    driven axle means removably fixed in approximately axial alignment with said vessel and adapted to couple with said dough hook; and
    a universal type, AC-DC, series wound induction motor rated between about 1/10 and about 1/15 horsepower with an unloaded speed of at least about 8,000 rpm and a speed at full load of no more than about 5,000 rpm connected to said driven axle through a speed-reducing transmission effecting a reduction of at least about 80:1; wherein
    said motor is removably fixed with respect to said vessel so that said vessel is prevented from moving with respect to said motor during the kneading mode of operation; and
    said kneading mode of operation is effected by an increasing load transmitted to the motor through the transmission from the dough hook.

2. A bread mixing machine according to claim 1 wherein said motor and said reducing transmission are coordinated to effect an initial mixing spead of about 80 to about 120 rpm and a kneading speed at full load of about 30 to about 45 rpm.

3. A bread mixing machine according to claim 1 wherein said reducing transmission includes a belt driven first stage of reduction.

4. A bread mixing machine according to claim 3 wherein said first stage of reduction effects a reduction ratio of at least about 4:1.

5. A bread mixing machine according to claim 1 wherein said driven axle is carried by support structure including means for releasably attaching said structure to said mixing vessel.

6. A bread mixing machine according to claim 5 wherein said mixing vessel is provided with an outer rim at its open top and said releasably attaching means includes:
    a latch operable to hold against the undersurface of said outer rim at a first location on the perimeter of said rim; and
    a pair of grips adapted to hold against the undersurface of said outer rim and each spaced from said latch more than one-fourth the length of the perimeter of said outer rim.

7. A bread mixing machine according to claim 6 wherein said grips and said latch are cam-shaped latches mounted on axles extending through said support structure and carrying thumb-operated handles.

8. A bread mixing machine according to claim 1 wherein said motor is mounted above said vessel at a location intermediate the axis and the perimeter of said mixing vessel.

9. A bread mixing machine according to claim 5 including an outer rim integral with the open top of said mixing vessel and wherein said support structure carries means for releasably attaching said structure to said mixing vessel, said means including:
    a latch operable to hold against the undersurface of said outer rim at a first location on the perimeter of said rim;
    a pair of grips, each spaced from said latch more than one-fourth the length of the perimeter of said outer rim, and each operable to press against the mixing vessel to hold against the under surface of said outer rim; and
    depending structure adjacent the inner wall of said mixing vessel to resist distortion of said vessel by said grips.

* * * * *